United States Patent
Weitkamp (10) Patent No.: US 6,940,186 B2
(45) Date of Patent: Sep. 6, 2005

(54) WIND TURBINE HAVING SENSOR ELEMENTS MOUNTED ON ROTOR BLADES

(75) Inventor: Roland Weitkamp, Belm (DE)

(73) Assignee: General Electric Company, Schenectady, NY (US)

( * ) Notice: Subject to any disclaimer, the term of this patent is extended or adjusted under 35 U.S.C. 154(b) by 12 days.

(21) Appl. No.: 10/427,998

(22) Filed: May 2, 2003

(65) Prior Publication Data

US 2004/0108732 A1 Jun. 10, 2004

(30) Foreign Application Priority Data

May 2, 2002 (DE) .......................... 102 19 664

(51) Int. Cl.⁷ .............................. F03D 7/04; F03D 9/00; H02P 9/00; H02P 9/04
(52) U.S. Cl. .......................................... 290/44; 290/55
(58) Field of Search ..................................... 290/44, 55

(56) References Cited

U.S. PATENT DOCUMENTS

| | | | | |
|---|---|---|---|---|
| 3,547,555 A | * | 12/1970 | Jensen | 416/61 |
| 4,026,660 A | * | 5/1977 | Ueda et al. | 416/61 |
| 4,324,528 A | * | 4/1982 | Svenning | 416/132 B |
| 4,366,387 A | * | 12/1982 | Carter et al. | 290/55 |
| 4,379,678 A | * | 4/1983 | Carlock et al. | 416/98 |
| 4,435,646 A | * | 3/1984 | Coleman et al. | 290/44 |
| 4,525,626 A | * | 6/1985 | Kush et al. | 250/227.19 |
| 4,765,742 A | * | 8/1988 | Davinson | 356/624 |
| 4,792,281 A | * | 12/1988 | Coleman | 416/156 |
| 4,894,787 A | * | 1/1990 | Flannelly et al. | 702/42 |
| 4,946,354 A | * | 8/1990 | Aubry et al. | 416/158 |
| 5,033,694 A | * | 7/1991 | Sato | 244/78 |
| 5,140,856 A | * | 8/1992 | Larsen | 73/455 |
| 5,178,518 A | * | 1/1993 | Carter, Sr. | 416/11 |
| 5,354,175 A | * | 10/1994 | Coleman et al. | 416/9 |
| 5,584,655 A | * | 12/1996 | Deering | 416/31 |
| 5,639,215 A | * | 6/1997 | Yamakawa et al. | 416/23 |
| 5,749,540 A | * | 5/1998 | Arlton | 244/17.13 |
| 5,961,080 A | * | 10/1999 | Sinha | 244/204 |
| 6,076,776 A | * | 6/2000 | Breitbach et al. | 244/219 |
| 6,092,990 A | * | 7/2000 | Hassan et al. | 416/42 |
| 6,200,096 B1 | * | 3/2001 | Kohlhepp | 416/24 |
| 6,295,006 B1 | * | 9/2001 | Kohlhepp | 340/946 |
| 6,304,194 B1 | * | 10/2001 | McKillip | 340/962 |
| 6,320,273 B1 | * | 11/2001 | Nemec | 290/55 |
| 6,327,957 B1 | * | 12/2001 | Carter, Sr. | 91/41 |
| 6,394,397 B1 | * | 5/2002 | Ngo et al. | 244/199 |
| 6,453,669 B2 | * | 9/2002 | Kennedy et al. | 60/527 |
| 6,465,901 B2 | * | 10/2002 | Croes | 290/55 |
| 6,492,743 B1 | * | 12/2002 | Appa | 290/55 |
| 6,499,690 B1 | * | 12/2002 | Katayama et al. | 244/17.11 |
| 6,619,918 B1 | * | 9/2003 | Rebsdorf | 416/1 |
| 6,648,599 B2 | * | 11/2003 | Preissler | 416/1 |
| 6,678,060 B2 | * | 1/2004 | Heyworth | 356/614 |
| 6,703,718 B2 | * | 3/2004 | Calley et al. | 290/44 |
| 6,726,439 B2 | * | 4/2004 | Mikhail et al. | 415/4.1 |
| 6,850,821 B2 | * | 2/2005 | Weitkamp | 700/286 |

* cited by examiner

*Primary Examiner*—Darren Schuberg
*Assistant Examiner*—Pedro J. Cuevas
(74) *Attorney, Agent, or Firm*—Blakely, Sokoloff, Taylor & Zafman LLP (57) ABSTRACT

The invention relates to a wind power plant with a tower, a rotor having at least one rotor blade being substantially radially distant with respect to a rotor axis and being rotatably supported with respect to a substantially horizontal rotation axis in a portion at the top of said tower, preferably at machine nacelle rotatably supported on a rotation axis extending substantially along the gravitational direction, a sensor means associated to said rotor for generating sensor signals depending on the mechanical load of the rotor, and an analysis means, especially a data processing means, wherein at least two, preferably pair-wise mounted, sensor elements are associated to at least one, preferably to each, rotor blade of the rotor and the evaluation means is designed for determining evaluation signals representing the mechanical loads of at least one rotor blade on the basis of the sensor signals generated by the sensor elements associated to this rotor blade.

31 Claims, 8 Drawing Sheets

Torque

FIG. 5B

Pitch Moment

WIND TURBINE HAVING SENSOR ELEMENTS MOUNTED ON ROTOR BLADES

The invention relates to a wind power plant with a tower, a rotor having at least one rotor blade being substantially radially distant with respect to a rotor axis and being rotatably supported with respect to a substantially horizontal rotation axis in a portion at the top of said tower, preferably at machine nacelle rotatably supported on a rotation axis extending substantially along the gravitational direction, a sensor means associated to said rotor for generating sensor signals depending on the mechanical load of the rotor, and an analysis means, especially a data processing means, receiving said sensor signals, and a control arrangement for such a wind power plant and a method for operating such a wind power plant.

Nowadays, large wind power plants have rotor diameters of more than 80 m resulting in possibly strongly varying wind speeds across the area of the rotor. With regard to profitability of these plants, it is desirable to incorporate information about the wind speed distribution and, especially, about the loads on the individual rotor blades into the adjustment or control, respectively, of the operation parameters. This method called "blade feedback" is described in the prior art, e.g., in U.S. Pat. No. 4,297,076 A, DE 300 9 22 A1 and PCT/EP98/03776. So far, business applications of such methods failed due to the lack of sufficiently simple, persistent, and reliable and, thus, profitable measuring systems.

Especially for off-shore wind power plants, the risk is high that the complex feedback system fails and, accordingly, the wind power plant cannot be operated or only with a reduced power characteristic for any length of time since the benefit earned by such wind power plants within a year can be lost by only a few days of downtime. In DE 300 99 22 A1, the use of strain gauges for sensing the load on the rotor blades is proposed. However, these strain gauges do not even approximately attain the required life time of $10^8$ stress cycles. The acceleration and wind sensors also mentioned in this publication have to be mounted in the outer regions of the rotor blades and are, therefore, only difficultly accessible and highly jeopardized by lightnings so that an enormous effort is required to attain the desired life time of 20 years.

Furthermore, measuring methods using optical fibers, e.g. the Fibre Bragg Grating Technology, are known in the prior art. In this technique, the intrinsic Bragg sensor elements are distributed along a single optical fiber which is attached to the rotor blades lengthwise or may also be insert laminated. This technique allows for sensor redundancy on the one hand and for an approximate sensing of integral variables like, e.g., the sag of the rotor blade on the other hand. The system is insensitive to lightnings and easily maintainable because the complex evaluation electronics can be housed completely in the easily accessible rotor hub portion or machine nacelle. However, when the optical fiber breaks, the whole system fails. Furthermore, at present the application of this technology involves considerable investment costs.

Finally, a simple apparatus for sensing oscillations is known from DE 198 47 982 C2 which is provided for the qualitative sensing of aeroelastic oscillations of the rotor blades in the rotation plane of the rotor. However, the apparatus according the aforementioned publication is adversely affected by the fact that this apparatus can only be used for the qualitative sensing of oscillations and does not meet the higher demands of a quantitative measurement of the loads.

In view of the above described problems of the prior art, it is an object of the present invention to provide a wind power plant with a precise, accurately calibrateable but still simple, robust and durable blade feedback system which can be build in commercial wind power plants with only little effort of design and assembly, to provide a control arrangement for such a wind power plant and to provide a method for operating such a wind power plant.

According to a first aspect of the present invention, this object is solved by an improvement of known wind power plants which is substantially characterized in that at least one, preferably each, rotor blade of the rotor is associated with at least two, preferably pairwise mounted, sensor elements and that an evaluation means is designed for determining evaluation signals representing the mechanical loads of at least one rotor blade on the basis of the sensor signals generated by the sensor elements associated with said rotor blade.

This invention is based on the insight that in modem wind power plants the loads at the root of the rotor blade is substantially characterized by a superposition of the bending moments from the aerodynamics (substantially perpendicular to the plane of the rotor, moment of shock), bending moments from the self-weight of the rotor blades, substantially in the rotor plane (moment of pivoting), normal forces resulting from the self-weight and the centrifugal force (depending on the revolutions of the rotor) as well as forces and moments from the dynamics of the rotors which are especially important if undesirable oscillations are established. It is necessary for the realization of an accurately calibrateable blade feedback system to compensate for the normal forces depending on the rotor position and the revolutions, which may attain a magnitude of about 10% of the desired measurement signals in recent wind power plants, in the sensor signals as well as improving the reliability of the sensors by redundancy. Since wind power plants can be operated within a large temperature range (e.g., −15° to +50° C.), it is also important to compensate for the temperature dependence of the sensors. Exactly these requirements are met by the preferred pairwise arrangement of at least two sensor elements per rotor blade.

In a preferred embodiment of the present invention, a control means receiving the evaluation signals is provided, wherein at least one operational parameter of the wind power plant, e.g. blade pitch, revolutions and/or yaw angle, can be adjusted by said control means depending on the evaluation signals. The blade twist can be accomplished by the variation of the pitch (pitch angle) and/or by using aerodynamical aids.

In a first preferred embodiment of the present invention, the sensor elements are mounted on sides of the rotor blade opposing each other substantially in the interesting direction of load. In this case, the sensor elements measure opposed signals (e.g. tension and pressure) for a predominant bending load. If the sensor signals are detected individually, it is possible, by adding or subtracting the sensor signals, to precisely quantify both the interesting bending moment and the, in the sense of blade feedback, parasitic influences of ambient temperature and normal forces due to gravitation and centrifugal forces. The proper operation of the sensors can be keenly checked by the evaluation means, preferably realized in the form of a data processing means, since perfectly mirrored sensor signals should be available after subtraction of the parasitic influences on the sensor elements and consideration of the design features. Supplementary, the parasitic influences can be computationally balanced under consideration of the temperature characteristics of the sensor elements and of the design features of the rotor blades (mass distribution) by additional sensor elements for sensing temperature, revolutions and position of the rotor and transmitting corresponding sensor signals to the evaluation means.

If one of the sensor elements fails in an ordinary wind power plant having two or three rotor blades, this is detected within a fraction of a second by the evaluation means and switched to the redundant operation mode. Thereby, the defective sensor element can be identified quickly with the aid of the functional sensor elements in the other rotor blade(s) and due to the fact that the individual rotor blades generate similar sensor signals substantially phase shifted (by 180° in the case of a two-bladed rotor, by 120° in the case of a three-bladed rotor), and/or also with the aid of the aforementioned additional temperature, revolutions and position sensors. The detection by additional sensor elements is also possible in the case of a single-bladed rotor. Thereafter, the sensor signals stemming from the defective sensor element are ignored and the parasitic influences of the remaining sensor element(s) are computationally compensated either by evaluating the temperature, revolutions and position sensor elements of by a computational transformation of the prior determined parasitic influences of the other rotor blade(s). Therefore, the wind power plant improved according to the present invention can also be continually operated during the failure of a sensor element until the maintenance team alerted by the remote monitoring has replaced the defective sensor element. Thus, in a three-bladed plant signals for each blade can be obtained for each blade feedback system even on the failure of up to three sensor elements as long as not every sensor element of an individual blade breaks down. Depending on the quality of the signal attained by the reduced number of sensor elements, it may become necessary to reduce the power characteristic to avoid any risk of a plant overload. It is also conceivable to compute the load on the basis of the other rotor blade(s) in case the complete set of sensors of one rotor blade breaks down. However, the risk of overloads increases thereby due to the increased uncertainty.

In a second embodiment of the present invention, the sensor elements are preferably disposed directly side by side or are disposed along a line extending substantially parallel with respect to the longitudinal axis of the rotor blade. A spatial separation of the sensor elements reduces the risk of simultaneous damaging of all sensor elements of one rotor blade due to force, lightning or similar. On the other hand, the detected sensor signals must be computationally compensated for their spatial variation. Since signals of the same kind are recorded in this one-sided solution, no information about the centrifugal forces or the self-weight can be derived. Furthermore, no direct temperature compensation can be accomplished. If a computational compensation of the influences of temperature, self-weight and centrifugal forces is desired, optional sensor elements for the detection of temperature, revolutions and rotor position are mandatory. Likewise, only the additional sensor elements may be accessed for compensation of the parasitic influences in the case of a failure of the sensor elements.

Within the framework of the present invention, it was also conceived that the disadvantage of doubling the number of measuring channels in the improved wind power plant according to the present invention is not relevant with respect to the actual cost structure of data acquisition systems for wind power plants compared to the enormous benefit of the thus achieved redundancy.

As is explained above, two sensor elements per rotor blade is absolutely the minimum number with respect to redundancy. Naturally, the number of sensor elements can be increased arbitrarily, wherein it is especially preferable to position the sensor elements pair-wise along a rotor radius but to position said pairs on different rotor blade radii, since additional information about the load distribution along the length of the rotor blades can be obtained thereby. If the radius positions of the individual sensor elements are not spaced too much from each other (max. 10–20% of the length of the blade), the loads can be computationally transformed (interpolation or extrapolation, respectively) from one radius position to the next with sufficient precision. With this background, it can also be thought of disposing the sensor elements not pair-wise but basically offset from each other which, however, increases basically the uncertainty of the interpolation or extrapolation method, respectively.

A further preferred realization of numerous sensor elements being distributed along the whole rotor radius is obtained by Fibre Bragg Grating Technology.

For extraction of the parasitic effects, two chains of sensor elements can thereby be preferably applied to the opposite sides of the rotor blade. Due to the temperature dependence of this technology, further temperature sensor elements are advantageous. Preferably, Bragg gratings are also used therefor, which Bragg gratings are applied so that they are free from external loads. Thereto, the additional Bragg gratings can be inserted into respective tubes. For measuring of pivot loads, the fibers are preferably applied to the spar flanges for measuring shock loads, and are preferably applied to the nib or end edge portion for measuring pivot loads. For obtaining redundancy with respect to fiber breakage without increased costs by sensor redundancy, the chain of sensor elements is formed as a U-shaped loop in an especially preferred embodiment of the present invention. On a potential fiber breakage, the sensor elements can be addressed starting from the blade root or the rotor hub via one of the fiber ports according to the position of the breakage. Only in case of a fiber breakage exactly within a sensor element, this sensor element is rendered useless and the unavailable sensor signals must be interpolated via the neighboring sensor elements.

For measuring the shock load on the rotor blades, the sensor elements are preferably applied on each side of the rotor blade in a separate U-shaped loop, especially since the costs of the additional optical fibers are negligible compared to the more difficult application during the usual manufacturing process. Doubling the number of fiber ends does also not pose any problem since a simple optical Y-coupler suffices to maintain the number of channels. For measuring pivot loads or during a manufacturing process in which both spar flanges are prefabricated in a component, it may also be advantageous to link both chains of sensor elements to a single loop, whereby, naturally, only a somewhat lower level of redundancy is achieved.

In a further advantageous embodiment of the present invention it is provided with respect to system reliability to sense, additionally or alternatively to the blade loads, also the resulting pitch and yaw moments in the nacelle. Here, it is especially advantageous for the currently widely used rotor bearing design, the so-called three-point bearing, to sense the pitch and yaw moments as well as the rotor torque by distance sensors at the elastic gear suspension. If redundancy is desired also in this case, six distance sensors are required, four in vertical direction and two in horizontal direction, wherein this sensor have to be distributed symmetrically on both sides of the gear suspension. Otherwise, only three sensor elements are sufficient.

In the embodiment having six sensor elements, the vertical sensors may be connected into a full bridge in same direction and in opposite direction, whereby the torque as well as the pitch moment can be sensed in a temperature compensated way with high resolution. The yaw moment is sensed by the horizontal sensor elements in the manner of a half bridge, but is also temperature compensated due to the opposite signals. For securing redundancy, the aforementioned circuitry has to be implemented not in the hardware but only in the algorithm of the signal evaluation means or the data processing means, respectively, since only in this way it may be switched to the logical equivalent network on failure of a sensor element. If necessary, temperature compensation may then be accomplished computationally, e.g. by evaluating the signal of the internal nacelle temperature which is usually available for the turbine control or of an additional temperature sensor element.

With regard to maintaining a high accuracy of measurement for the sensing of pitch and yaw moments, it has proven to be advantageous for wind power plants with a rotor which is rotatably supported with respect to the rotor axis by means of a rotor bearing usually penetrated by a rotor shaft coupled to the rotor and extending parallel to the rotor axis, that the sensor means comprises at least three, preferably at least four, especially preferred five or more, sensor elements disposed in a plane extending substantially perpendicularly to the rotor axis and being located at the side of the rotor bearing which is opposite to the plane of the rotor blades, since a longer lever arm is available at the side of the rotor bearing which is opposite to the plane of the rotor blades for sensing pitch or yaw moments, and arranging the sensor elements in a plane extending perpendicularly to the rotor axis considerably simplifies the evaluation of the results of the measurements. Especially, the results of the measurements are not influenced by an axial clearance of the rotor shaft.

With regard to simplification of the evaluation of the results of the measurements and to reduction of evaluation complexity for detecting defective sensor elements, it has proven especially advantageous if at least three sensor elements are disposed on a circle extending coaxially to the rotor axis. In this case, the desired redundancy in sensing pitch and yaw moments can be achieved if only one additional sensor element is disposed on said circle. Redundancy may be increased arbitrarily when four, five or more sensor elements are disposed on the circle extending coaxially to the rotor axis, since only three sensor elements disposed at the edges of a triangle are required for sensing pitch and yaw moments because the rotor axis is already uniquely defined by this arrangement using three sensor elements as the intersection of the mean perpendiculars of the sides of the triangle formed by the sensor elements.

Insofar four sensor elements disposed on a circle which extends coaxially to the rotor axis are provided, it has proven appropriate with regard to reduction of computational complexity of the evaluation of the results of the measurements to dispose these sensor elements at the edges of a rectangle, especially a square. When using five or more sensor elements, they are preferably disposed at the edges of a corresponding regular polygon. For sensing pitch or yaw moments, the sensor elements disposed in a plane extending normal to the rotor axis and, preferably, on a circle extending coaxially to the rotor axis can be disposed at a rotor shaft coupled to the rotor and extending coaxially to the rotor axis and/or to a clamping set connecting the rotor shaft to the gear box and/or further moving components of the wind power plant. Insofar the sensor elements are disposed outside a gear box coupled to the rotor shaft, the measurement is not influenced by forces acting in the gear box, e.g. the distribution of planet forces within a planet gear. However, interferences due to a radial bearing clearance of the rotor shaft bearing are noticeable in this arrangement of the sensor elements at the rotor shaft or the clamping set.

When the rotor is coupled to a planet gear, especially to the pinion cage (Planetenträger) of the planet gear, via the rotor shaft, these interferences can be prevented if at least three, preferably at least four, sensor elements are disposed in the region of the planet gear. Here, the sensor elements may be disposed in the region of an outer periphery of the ring gear of the planet gear. If the sensor elements are disposed with an axial distance at the front of the ring gear, also the distribution of the planet forces causing a deformation of the ring gear can be sensed. In case sensing of the distribution of the planet forces is not desired but only considered as a perturbation of the measurement of the pitch and yaw moments, the accuracy of measurement can be improved in that at least one, preferably at least three, sensor elements are disposed in a region of a cover and/or torque support attached to the front of the ring gear and/or in a adjacent region of the ring gear. In this case, no considerable perturbation of the measurement of pitch and yaw moments by a deformation of the ring gear occurs due to the stiffening effect of the attachment part.

With the above described arrangement of sensor elements, additionally a simple detection of torque by a redundant sensor means at simple detection of defective sensor elements can be achieved, if the sensor means additionally comprises at least one, preferably for redundancy at least two, sensor elements, preferably disposed in the same plane, said sensor elements sensing a torsion of the power train with respect to the rotor axis for the detection of torque. With at least two sensor elements, the definite detection of sensor failure is possible by comparison with the other sensor elements. The sensor means of a wind power plant according to any embodiment of the present invention can also comprise at least one inductive, mechanical, optical acoustical (also ultrasonic) and/or magnetoresistive sensor element, wherein the desired redundancy can be increased arbitrarily by combining different types of sensors.

It is especially advantageous in this embodiment of the present invention if the blade signals, especially the blade root signals, and the signals used for sensing the pitch and gear moments, especially of the gear suspension, are linked.

As a first approximation, the pitch and gear moments and the torque acting on the gear suspension are only the sum of the bending moments at the blade roots which have to be converted from the center of the rotor to the gear suspension with the aid of the design features. If the bending moments at the root of the rotor blade are measured in both load directions (in the rotor plane and normal to it), the required algorithms are provided by the prior art. These interrelationships are described, e.g., in DE 198 49 365.8. It is also within the framework of the present invention to compute the non-available information mathematically by subtraction in the event of complete sensor failure of a rotor blade (e.g. due to lightning). This procedure is of great advantage with respect to the demanded redundancy.

In contrast to the blade sensor elements which are calibrateable for different blade angles via the self-weight of the blades in machines with blade adjustment, such a simple possibility of calibrating does not exist for the pitch and yaw moments. Therefore, it is proposed within the framework of the present invention to attain a calibration during operation by deliberately introducing a quantifiable unbalance. This unbalance can be effected by a mass or by variation of the aerodynamical properties. For example, the method of slightly adjusting only a single rotor blade (about 1 to 10 degrees depending on wind speed and revolutions of the rotor) by single-blade adjustment and, then, recording the sensor signals for minimum and maximum revolutions of the rotor can be implemented simply by software modifications. Depending on the accuracy requirements, this method may be successively performed for each of the three blades at different blade angles.

A physically simpler method which is, however, accompanied by additional design effort uses, e.g., a water tank of preferably small diameter which is exactly positioned in the rotor axis and is provided, in case of a three-bladed rotor, at its end with three magnetic valves offset by 120 degrees. The water can be discharged into the ballast tanks provided in each of the rotor blades via a connecting conduit. Filling of the ballast tanks is also possible during operation due to the centrifugal force. Prior to discharging the ballast tanks, the rotor must be stopped in a corresponding position so that the water flows back due to gravity. Except the three magnetic valves, no further moving parts are thus required. Naturally, such a system can not only be used for calibrating the sensors but also for readjusting the rotor blades by trimming if there exists an unbalance in the rotor. The realization of such a trimming gear in a wind power plant according to a preferred embodiment of the present invention comprises a cavity, preferably a rotational symmetric cavity extending coaxially to the rotor axis, and a valve arrangement for selectively discharging a fluid contained in said cavity and a cavity formed in the rotor blade. Within the framework of the present invention, liquids and/or pourable bulk materials, e.g. sand, lead beads etc. are used for the fluid.

As is apparent from the above description of wind power plants according to various embodiments of the present invention, a control means according to the present invention adapted for upgrading already existing wind power plants is substantially characterized in that it contains at least two sensor elements and an evaluation means receiving sensor signals delivered by said sensor elements and being operatable for generating evaluation signals representing at least one significant load variable of the wind power plant on the basis of the sensor signals.

A method for operating a wind power plant according to an embodiment of the present invention is substantially characterized in that the evaluation means switches to a redundant operation mode in the event of sensor element failure, wherein the defective sensor element is computationally determined by comparison of the available sensor signals, the signals of said defective sensor element are ignored by the operating control, and the parasitic influences, with respect to the control system, of temperature, gravitation and/or centrifugal force of the remaining at least one functioning sensor element are computationally compensated. Furthermore, in a method according to an aspect of the present invention the sensor elements can be calibrated for sensing pitch and/or yaw moments using sensor signals obtained after the generation of a predetermined aerodynamical and/or mechanical unbalance. Especially for this purpose, wind power plants according to an embodiment of the present invention can be operated so that a fluid is discharged from a cavity extending coaxially to the rotor axis via the valve arrangement to one or more cavities formed in the rotor blades.

Next, the invention will be further explained with reference to the drawings to which explicit reference is made for details essential to the invention and not elaborated in the description. In the drawings.

Figures 1A, 1B:
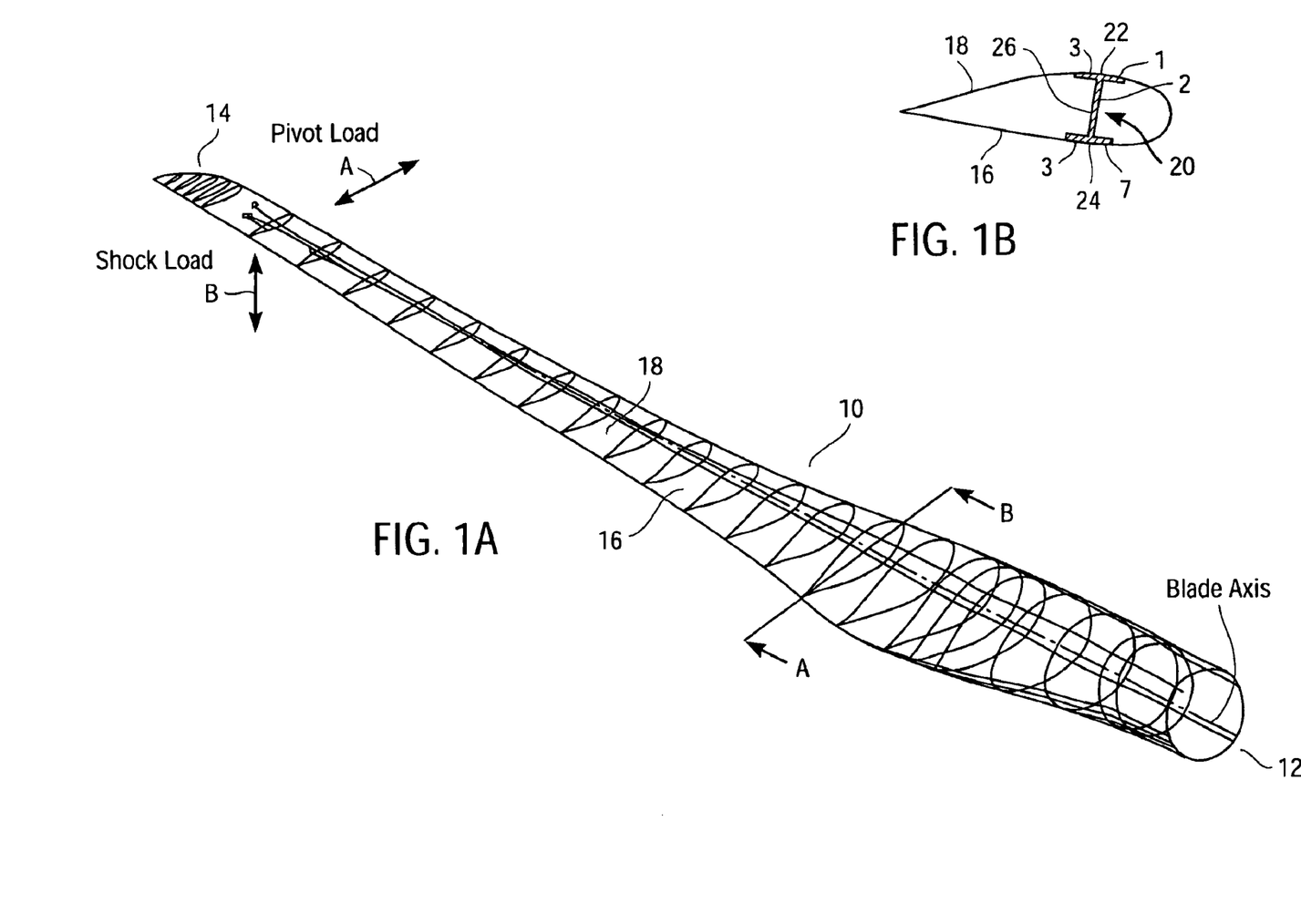
FIGS. 1A and 1B show a rotor blade of a wind power plant.

The rotor blade shown in FIG. 1A extends from a blade root 12 adjacent to the rotor hub in a direction extending substantially normal to the rotor axis to the tip 14 of the blade. For reinforcing the blade, a spar is provided (see FIG. 1B) which is, in total, designated by reference numeral 20 and comprises a web 26 and two spar flanges 22 and 24 extending substantially parallel to the peripheries 16 and 18 of the rotor blade 10. The overall shape of the spar is formed as an I-profile. During operation of a wind power plant, loads on the rotor blade may occur in the plane of the rotor blade, so-called pivot loads, as indicated by double arrow A. Furthermore, loads normal to the rotor plane, so-called shock loads, may occur as is indicated by arrow B in FIG. 1A.

Figure 2A:
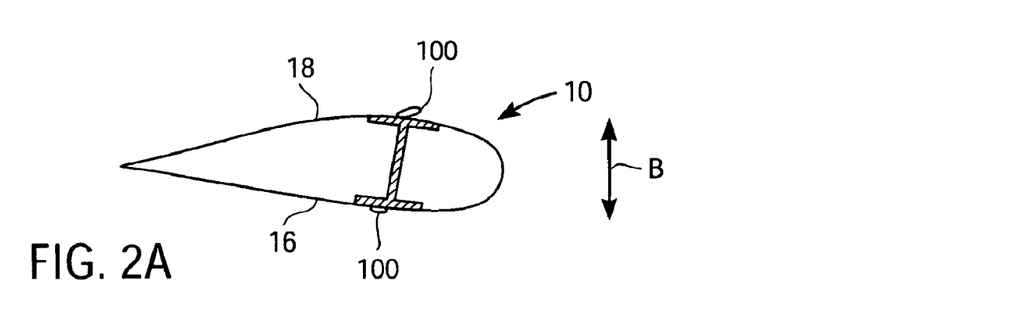
FIGS. 2A, 2B, 2C, and 2D show different versions of a first embodiment of the present invention.
Figure 2B:
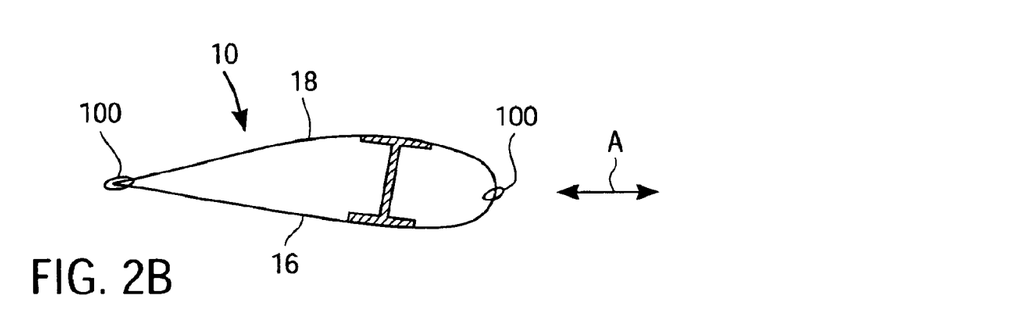
Figure 2C:
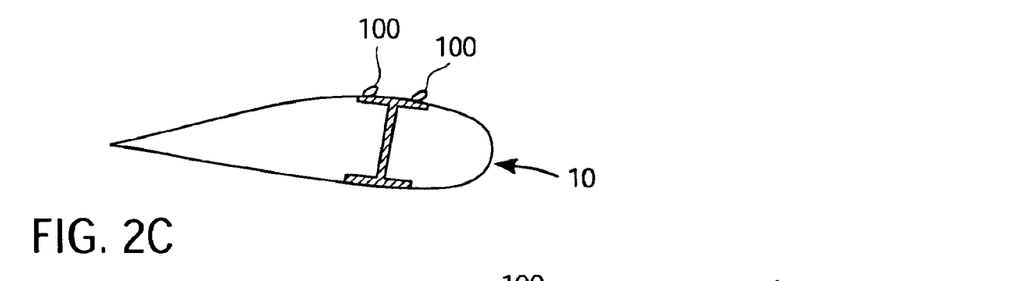

In the versions of a first embodiment of the present invention shown in FIGS. 2A to 2C, two sensor elements 100 are provided per rotor blade. By means of the arrangement shown in FIG. 2A of sensor elements 100 which are disposed on opposite sides 16 and 18 of the rotor blade, the shock loads on the rotor blade can be sensed.

In the embodiment of the present invention shown in FIG. 2B, the pivot loads on the rotor blade can be sensed especially advantageously, since the sensor elements are disposed in the nib and end edge portion of the rotor blade.

Figure 2D:
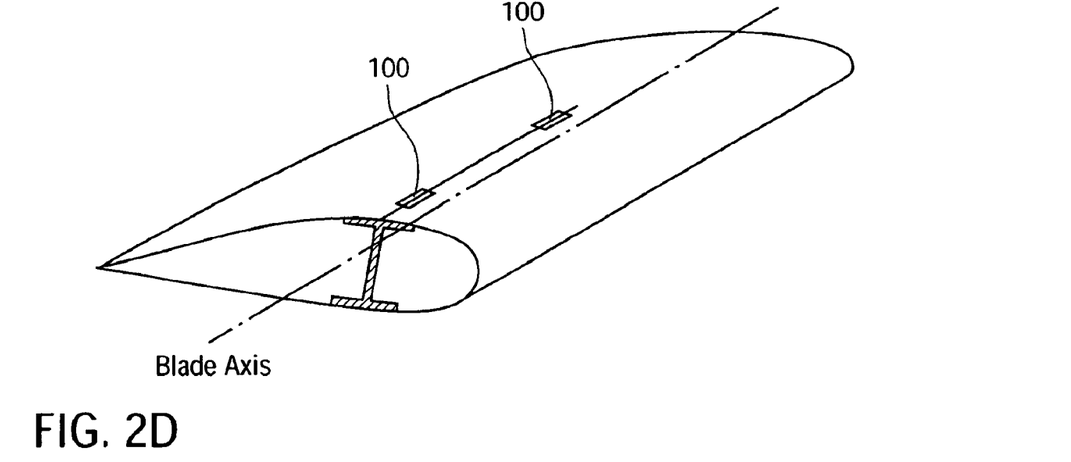

In the embodiment of the present invention shown in FIG. 2C, the sensor elements are directly juxtaposed in the region of the spar flange. In the arrangement shown in FIG. 2D, sensor elements 100 are disposed along a line extending substantially parallel to the longitudinal axis of the rotor blade. Here, spatial separation of the sensor elements reduces the risk of simultaneous damage of both sensor elements by force, lightning or similar.

Figure 3A:
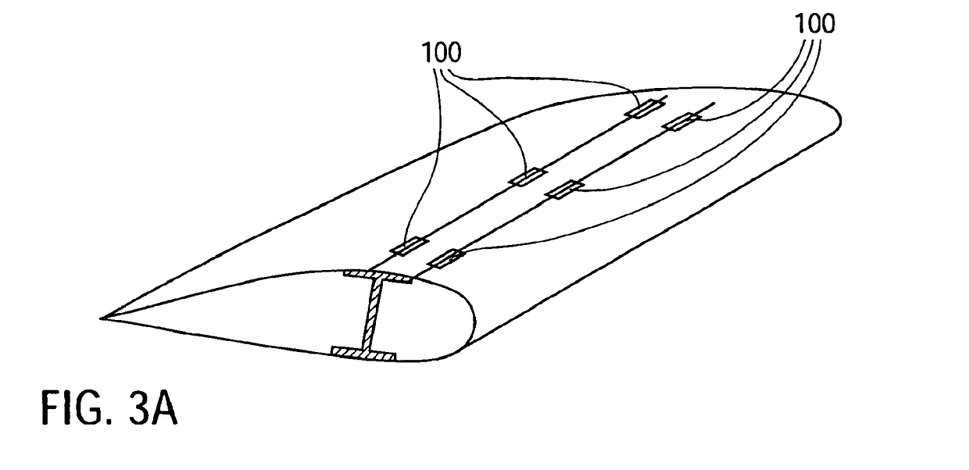
FIGS. 3A and 3B show different versions of a second embodiment of the present invention.

In the embodiment of the present invention shown in FIG. 3A, sensor elements 100 are respectively disposed pair-wise on a rotor, the, individual pairs being positioned at different radii of the rotor blade because additional information about the load distribution over the length of the rotor blade can be obtained thereby.

Figure 3B:
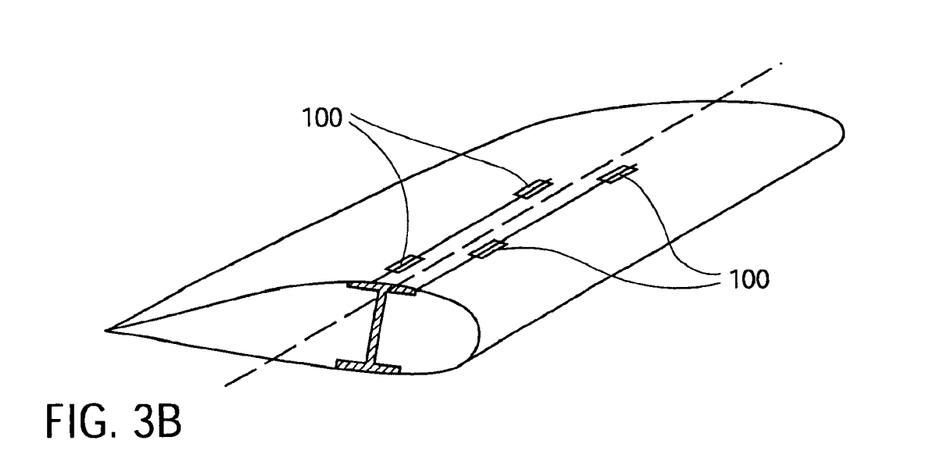

In the embodiment of the present invention shown in FIG. 3B, sensor elements 100 are not disposed pair-wise but are basically offset to each other which guarantees higher protection against simultaneous damaging of the sensor elements 100 but also increases the uncertainty of an interpolation or extrapolation method for determining the load distribution along the length of the rotor blade.

Figure 4A:
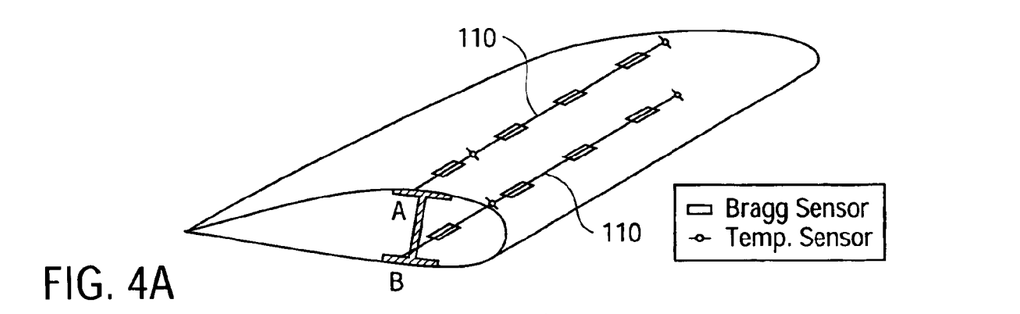
FIG. 4A, 4B, 4C, and 4D show different versions of a third embodiment of the present invention.
Figure 4B:
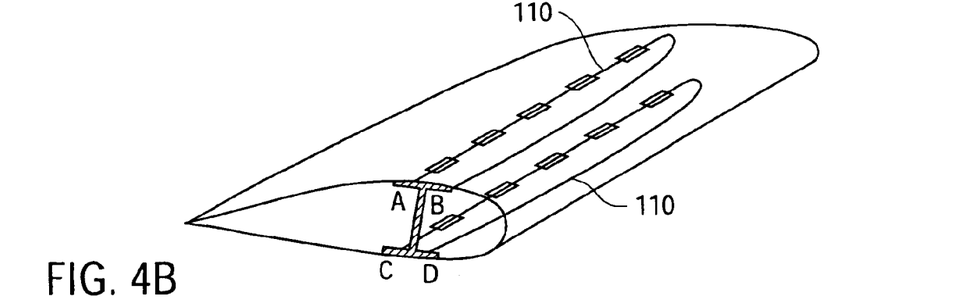

In the embodiment of the present invention shown in FIG. 4A, two chains 110 of sensor elements realized by Fibre Grating Technology are placed on opposite sides of the rotor blade. In an further development of the embodiment of FIG. 4A as it is shown in FIG. 4B, the chains 110 of sensor elements are placed in separate u-shaped loops at each side of the rotor blade.

Figure 4C:
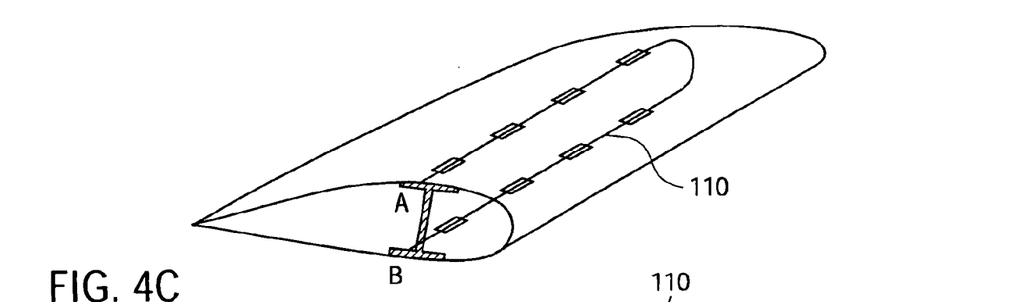
Figure 4D:
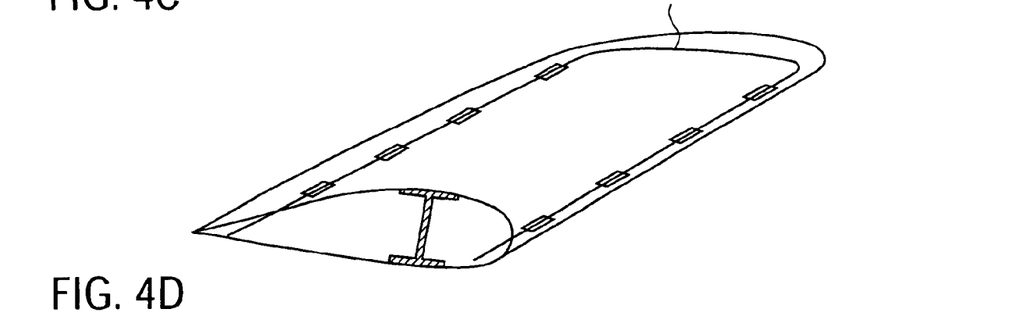

In the embodiments of the present invention shown in FIGS. 4C and 4D, both chains 110 of sensor elements are linked to a single loop which allows for a reduction of fiber length but also results in a somewhat reduced level of redundancy.

Figure 5A:
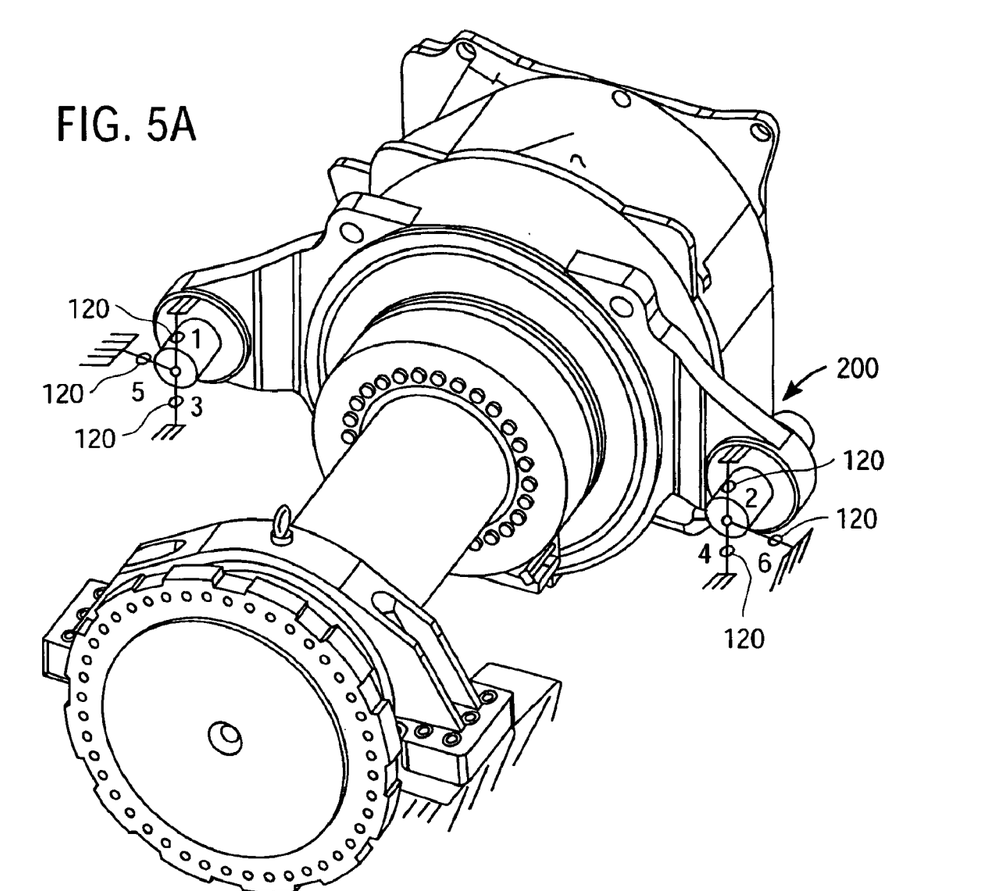
FIG. 5A is a detailed illustration of a drive train of a wind power plant according to an embodiment of the present invention having sensor elements disposed at an elastic bearing of the gear suspension.
Figure 5B:
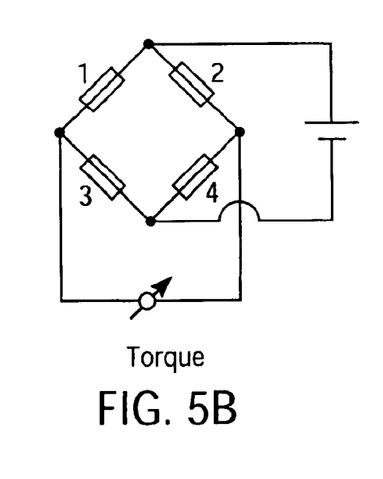
FIGS. 5B and 5C are sensor elements disposed at an elastic bearing of the gear suspension of the drive train of the wind power plant.
Figure 5C:
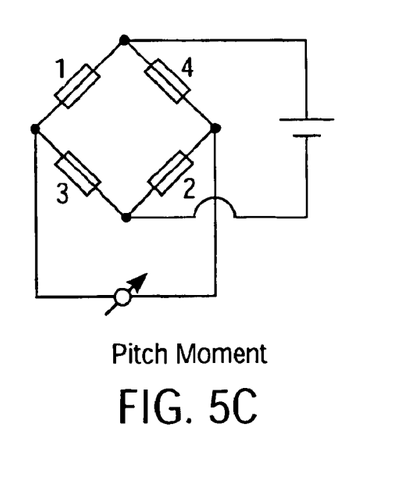

FIG. 5 shows the disposition of sensor elements at the elastic bearing of the gear suspension 200. Here, six distance sensors 120 are provided, four in vertical direction and two in horizontal direction, said distance sensor being symmetrically distributed on both sides of the gear suspension 200. The vertical sensors are connected to a full bridge in same direction and in opposite direction, whereby torque (see FIG. 5B) as well as yaw moment (see FIG. 5C) can be sensed with high resolution in a temperature compensated manner.

Figure 6:
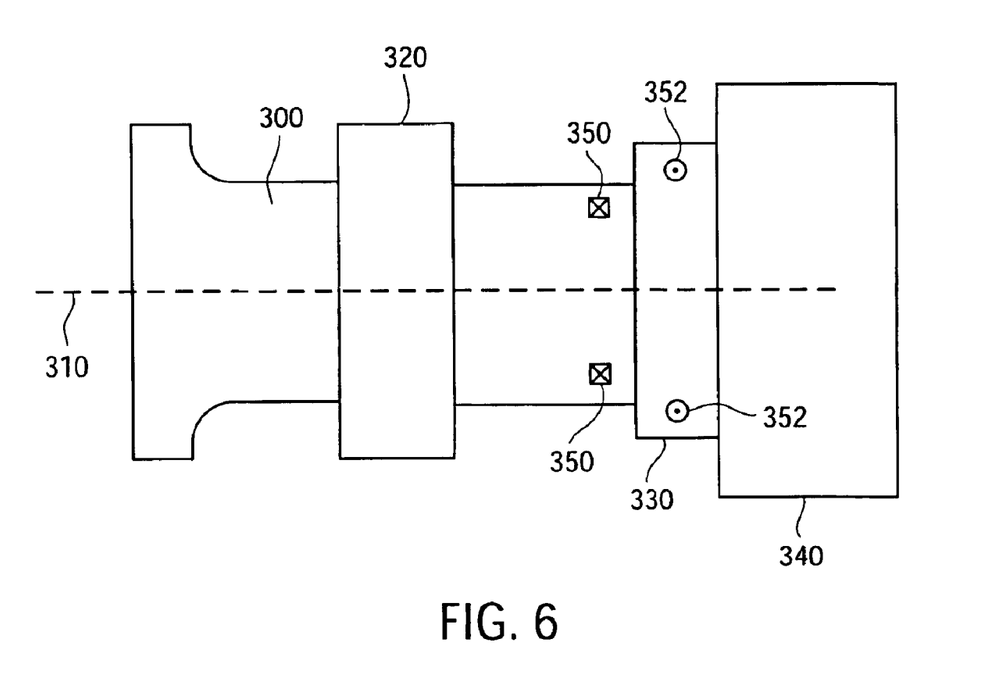
FIG. 6 is a schematic side view of a rotor shaft with a planet gear of a wind power plant according to an embodiment of the present invention coupled thereto.
Figure 7A:
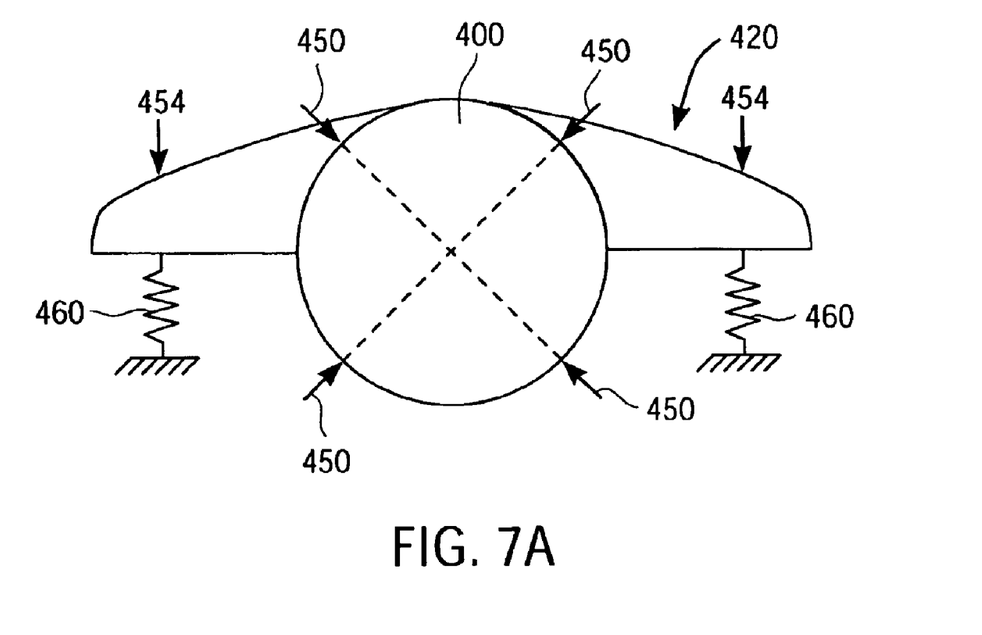
FIGS. 7A and 7B are illustrations of a sensor means of a wind power plant according to an embodiment of the present invention having sensor elements and being disposed at a planet gear.

FIG. 6 shows a rotor shaft 300 penetrating a rotor shaft bearing 320 and extending coaxially to the rotor axis 310. The rotor shaft 300 is coupled to a planet gear 340 via a clamping set 330, said planet gear being elastically supported on a supporting structure by means of elastically ductile elements 470 (see FIG. 7). In the embodiment of the present invention shown in FIG. 6, the sensor means comprises a total of four sensor elements 350 attached to the rotor shaft 300 and disposed on a circle extending coaxially to the rotor axis 310 for sensing pitch and yaw moments. Sensor elements 350 are disposed at the edges of a square. With this arrangement, pitch and yaw moments can be sensed independent of the axial clearance of the rotor shaft 300 in the rotor shaft bearing 320. By disposing the sensor elements 350 on a circle extending coaxially to the rotor axis 310, redundancy in sensing pitch and yaw moments and, simultaneously, facilitation of detecting defective sensor elements is achieved using only four sensor elements 350. In addition or alternative to sensor elements 350 being disposed at the rotor shaft 300, the embodiment of the present invention shown in FIG. 6 may also comprise sensor elements 352 disposed on a circle extending coaxially to the rotor axis 310 and at the clamping set 330 or other coupling gears. Rotor shaft 300 is coupled to a pinion cage (Planetenträger) of the planet gear 340 having a fixed ring gear, wherein a main drive pinion of the planet gear 340 is disposed at the sun wheel.

Figure 7B:
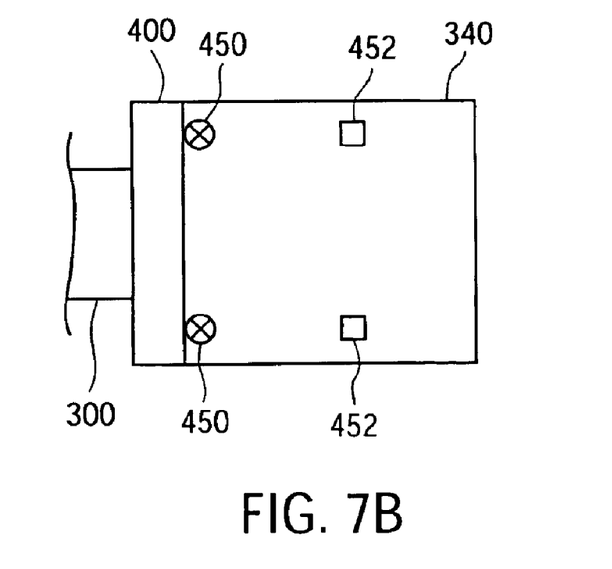

FIG. 7a shows a schematic view of a planet gear usable in a wind power plant according to an embodiment of the present invention. FIG. 7b shows a schematic side view of the planet gear shown in FIG. 7a. According to FIG. 7a, a torque support 400 with two lateral arms 420 is associated to the planet gear 340 and disposed at a front side of the ring gear. As is shown in FIG. 7a, the sensor elements used for sensing pitch and yaw moments can be disposed on a circle extending coaxially to the rotor axis in the region of the torque support. Thereby, a sensing of the pitch and yaw moments without interference from a radial bearing of rotor shaft 300 accepted in the rotor shaft bearing 320 is rendered possible. Furthermore, a measurement without interference from a deformation of the ring gear resulting from the influence of the planets of the planet gear acting on it is allowed by the arrangement of the sensor elements 450 in the region of the torque support. If further diagnostics of the distribution of planet forces is desired, further sensor elements 452 can be provided additionally or alternatively to the sensor elements 450 disposed in the region of the torque support also in an axial spacing to the torque support, e.g. in the center of the ring gear on its outer periphery, which sense also a deformation of the ring gear in addition to the pitch and yaw moments. Additionally, the wind power plant shown in FIG. 7 can also comprise sensor elements disposed in the region of the arms 420, preferably above elastically ductile elements 470, for sensing torsion of the drive train with respect to the rotor axis, wherein said sensor elements 454 are appropriately disposed in the same plane as sensor elements 450.

Figure 8:
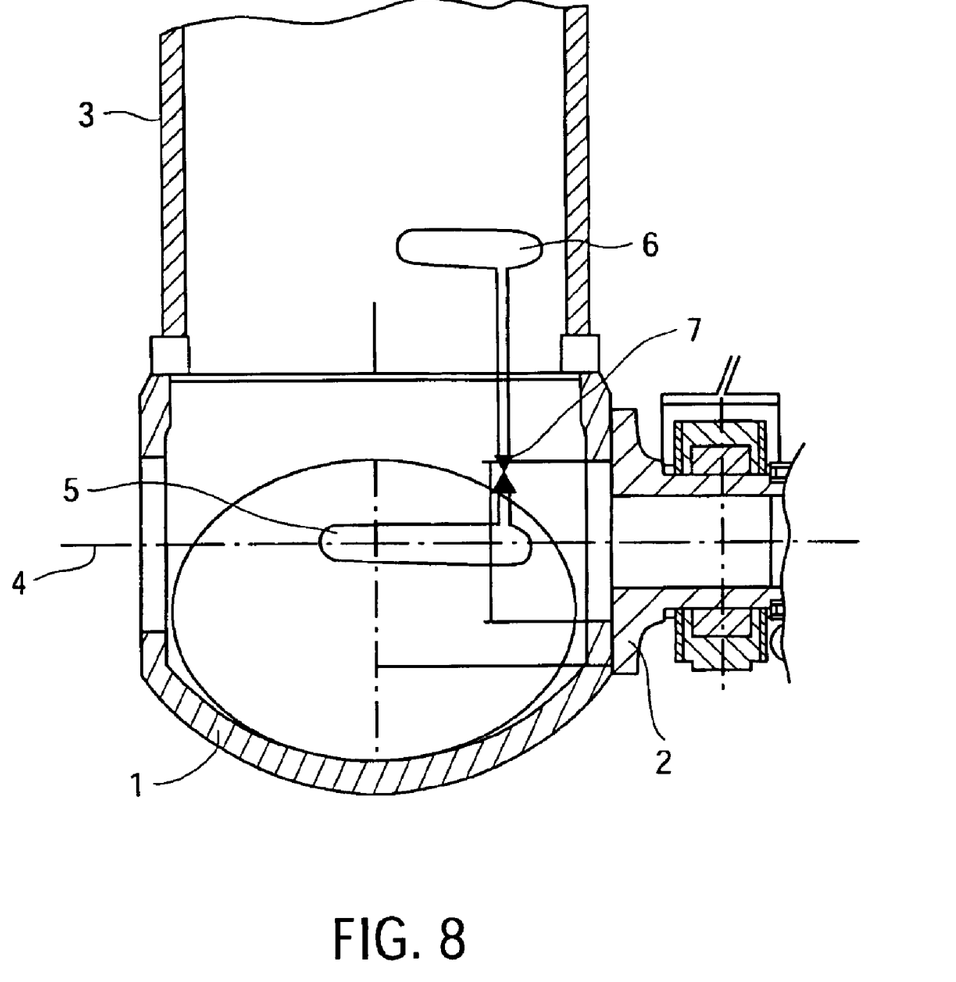
FIG. 8 is an axial sectional view of a rotor of a wind power plant according to a fourth embodiment of the present invention.

In the axial sectional view according to FIG. 8, a rotor shaft is designated by reference numeral 2, a rotor hub by 1 and a rotor blade by 3. A cavity 5 used as a water tank is disposed coaxially to rotor axis 4 of the rotor shaft 2, said cavity being connectable via a valve 7 to a ballast tank 6 disposed within rotor blade 3 to selectively discharge a fluid, e.g. a liquid and/or a pourable bulk material to the ballast tank and to thus achieve a desired trimming of the wind power plant.

What is claimed is:

1. A wind turbine, comprising:
   a rotor having at least one rotor blade capable of rotating with respect to a rotor axis of the rotor;
   a sensor coupled to the rotor to generate sensor signals based on a mechanical load of the rotor, the sensor including at least two sensor elements pair-wisely mounted on the at least one rotor blade of the rotor at opposite sides of a longitude axis of the rotor blade; and
   an evaluation unit coupled to the sensor to generate evaluation signals representing the mechanical loads of at least one rotor blade based on the sensor signals generated by the sensor elements.

2. The wind turbine of claim 1, wherein the evaluation unit is configured to determine temperature, centrifugally, and gravitationally corrected evaluation signals.

3. The wind turbine of claim 1, further comprising a control unit coupled to the evaluation unit to receive evaluation signals for adjusting at least one operating parameter including an angle of attack of a rotor blade.

4. The wind turbine of claim 1, wherein the at least two sensor elements are pair-wisely mounted on opposite sides of the rotor blade according to a direction of the mechanical load to be measured.

5. A wind turbine, comprising:
   a rotor having at least one rotor blade capable of rotating with respect to a rotor axis of the rotor;
   a sensor coupled to the rotor to generate sensor signals based on a mechanical load of the rotor, the sensor including at least two-sensor elements pair-wisely mounted on the at least one-rotor blade of the rotor; and
   an evaluation unit coupled to the sensor to generate evaluation signals representing the mechanical loads of at least one rotor blade based on the sensor signals generated by the sensor elements,
   wherein the evaluation unit receives additional signals from at least one of temperature sensor, revolutions, and rotor position sensor, wherein the evaluation unit determines influences of temperature, centrifugal force, and gravitation based on the received additional signals.

6. The wind turbine of claims 5,
   wherein the sensor elements are mounted on the same side of the rotor blade, directly adjacent or along a line extending substantially parallel to the longitudinal axis of the rotor blade, to generate the sensor signals used by the evaluation unit for compensation of the influences of temperature, revolutions, and gravitation.

7. The wind turbine of claim 1, wherein the sensor includes a plurality of sensor elements chained via an optical fiber in a U-shaped loop.

8. The wind turbine of claim 7, wherein both fiber ends are merged into a channel by an optical Y-coupler.

9. The wind turbine of claim 1, wherein at least one sensor element comprises a rod embedded within at least one rotor blade and a detection element detecting the displacement of said rod.

10. The wind turbine of claim 9, wherein the rod embedded in the rotor blade is beared by two support elements which are spaced within said rotor blade, and the detection element is attached to one of said support elements.

11. The wind turbine of claim 1, wherein the sensor elements are disposed in a way so that they substantially sense the mechanical loads in a shock direction of the rotor blade transverse to the plane of the rotor blade.

12. The wind turbine of claim 1, wherein the evaluation unit is operable to monitor operativeness of the sensor elements and to switch to a redundant operation mode on failure of at least one sensor element.

13. The wind turbine of claim 12, wherein in the redundant operation mode, the evaluation unit generates data for temperature compensation and for quantifying parasitic effects based on the signals of the operable sensor elements.

14. The wind turbine of claim 1, further comprising;
a gear suspension elastically beared on a machine nacelle rotatably supported on the rotor axis, wherein at least one sensor element is disposed at said elastic bearing of the gear suspension.

15. The wind turbine of claim 14,
further comprising at least three distance sensor elements disposed at the elastic bearing of the gear suspension to measure a movement of the gear suspension, at least one distance sensor element to sense a horizontal displacement of the gear and at least at least one distance sensor element to sense a vertical displacement of the gear suspension, wherein the sensor signals delivered by said distance sensor elements are evaluated so that the pitch moment, yaw moment, and torque applied to the suspension gear are determinable by said evaluation unit from the measured displacements to adjust at least one operating parameter.

16. A wind turbine, comprising:
a rotor having at least one rotor blade capable of rotating with respect to a rotor axis of the rotor;
a gear suspension for supporting the rotor, the gear suspension including two rotor bearings to rotatably support the rotor on opposite sides with respect to the rotor axis;
at least three distance sensor elements disposed on each rotor bearing, said distance sensor elements sensing the displacement of a cross section of the at least one rotor blade with respect to the rotor axis.

17. The wind turbine of claim 16
wherein the at least three distance sensor elements are approximately disposed on a circle extending coaxially on each rotor bearing with respect to the rotor axis.

18. The wind turbine of claim 16
further comprising at least four distance sensor elements are disposed on each rotor gearing in a pattern according to one of a rectangle and a square.

19. The wind turbine of claim 16
wherein the at least three distance sensor elements are disposed at a rotor shaft coupled to the rotor and extending coaxially to the rotor axis.

20. The wind turbine of claim 16
wherein the rotor is coupled to a planet gear via a rotor shaft and the at least three distance sensor elements are disposed in a region of the planet gear.

21. The wind turbine of claim 20
wherein the at least three distance sensor elements are disposed at an outer periphery of a ring gear of the planet gear.

22. The wind turbine of claim 21
wherein at least one distance sensor element is disposed axially spaced from a front side of said ring gear.

23. The wind turbine of claim 21
wherein at least one of the distance sensor elements is disposed in a region of a housing cover attached to a front side of at least one of said ring gear, a torque support, and a region of the ring gear.

24. The wind turbine of claim 1
wherein the at least two sensor elements spaced from each other in a direction of the rotor axis for sensing torques.

25. The wind turbine of claim 1
wherein the sensor comprises at least one of an inductive, mechanical, optical, acoustical and magneto-resistive sensor element for sensing the displacement of components.

26. The wind turbine of claim 1
wherein the control unit is operatable for generating an aerodynamical unbalance and a mechanical unbalance to calibrate the sensor elements for sensing pitch or yaw moments.

27. The wind turbine of claim 1 further comprising
a cavity rotational symmetric and extends collinear to the rotor axis, and a valve arrangement for selectively discharging a fluid contained in said cavity into a cavity formed in the rotor blade.

28. A method for operating a wind turbine, the method comprising:
generating sensor signals using a sensor coupled to a rotor having at least one rotor blade capable of rotating with respect to a rotor axis of the rotor, the sensor including at least two sensor elements attached to the at least one rotor blade to generate the sensor signals based on a mechanical load of the rotor blade, the at least two sensor elements pair-wisely mounted at opposite side of a longitude axis of the rotor blade; and
in response to failure of at least one of the at least two sensor elements, switching to a redundant operation mode in which the sensor signals are generated from a remainder of the at least two sensor elements that are operable, wherein signals from at least one failed sensor elements are ignored.

29. A method for operating a wind turbine, the method comprising:
generating sensor signals using a sensor coupled to a rotor having at least one rotor blade capable of rotating with respect to a rotor axis of the rotor, the sensor including at least two sensor elements attached to the at least one rotor blade to generate the sensor signals based on a mechanical load of the rotor blade, the at least two sensor elements pair-wisely mounted at opposite side of a longitude axis of the rotor blade;
in response to failure of at least one of the at least two sensor elements, switching to a redundant operation mode in which the sensor signals are generated from a remainder of the at least two sensor elements that are operable, wherein signals from at least one failed sensor elements are ignored; and compensating parasitic influences of temperature, gravitation, and centrifugal force on the remaining at least one operable sensor element.

30. The method of claim 30, further comprising calibrating the sensor elements using sensor signals for sensing pitch and yaw moments which are obtained after the generation of a predetermined aerodynamical and mechanical unbalance.

31. The method of claim 30, further comprising discharging a fluid contained in a cavity extending collinear with respect to the rotor axis into at least one cavity formed in one of the rotor blades.

* * * * *